(12) United States Patent
Fang

(10) Patent No.: US 8,942,170 B1
(45) Date of Patent: Jan. 27, 2015

(54) GROUP IDENTIFICATION OF WIRELESS COMMUNICATION DEVICES

(75) Inventor: Yonggang Fang, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 306 days.

(21) Appl. No.: 13/228,345

(22) Filed: Sep. 8, 2011

Related U.S. Application Data

(60) Provisional application No. 61/381,047, filed on Sep. 8, 2010.

(51) Int. Cl.
*H04W 4/00* (2009.01)

(52) U.S. Cl.
USPC ............... 370/328; 370/329; 455/519

(58) Field of Classification Search
USPC .................. 370/328, 329; 455/519
See application file for complete search history.

(56) References Cited

U.S. PATENT DOCUMENTS

| | | | | |
|---|---|---|---|---|
| 6,385,201 | B1 * | 5/2002 | Iwata | 370/400 |
| 7,778,212 | B2 * | 8/2010 | Lee | 370/312 |
| 2011/0134841 | A1 * | 6/2011 | Shaheen | 370/328 |
| 2011/0307694 | A1 * | 12/2011 | Broustis et al. | 713/163 |

* cited by examiner

*Primary Examiner* — Donald Mills
*Assistant Examiner* — Henry Baron
(74) *Attorney, Agent, or Firm* — Perkins Coie LLP

(57) ABSTRACT

A wireless communications method includes registering, in a first wireless network, a group of wireless devices from a second wireless network and facilitating group casting communication between said group of wireless devices and a server operating in said first wireless network. In one aspect, the group casting communication may be performed for machine to machine (M2M) communication between a group of wireless devices and a server.

18 Claims, 14 Drawing Sheets

HRPD M2M ID Numbering

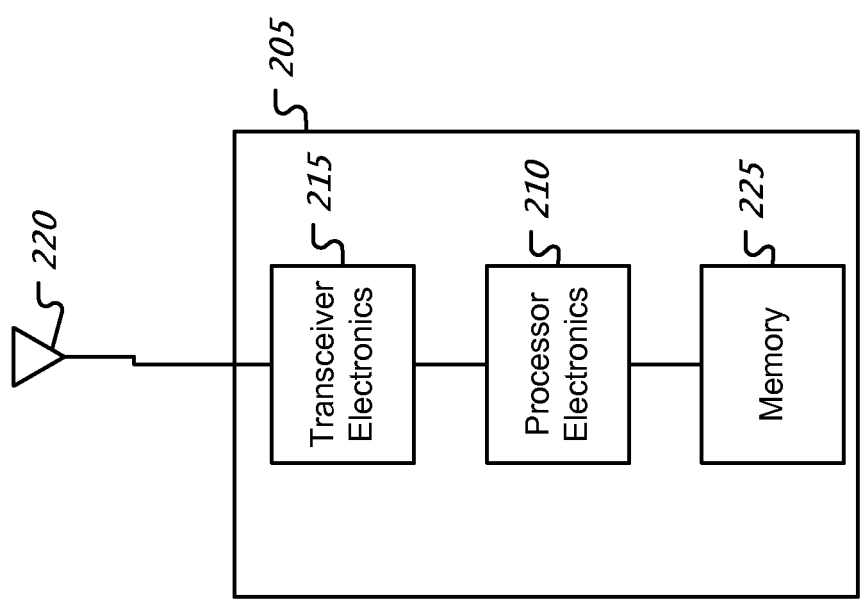

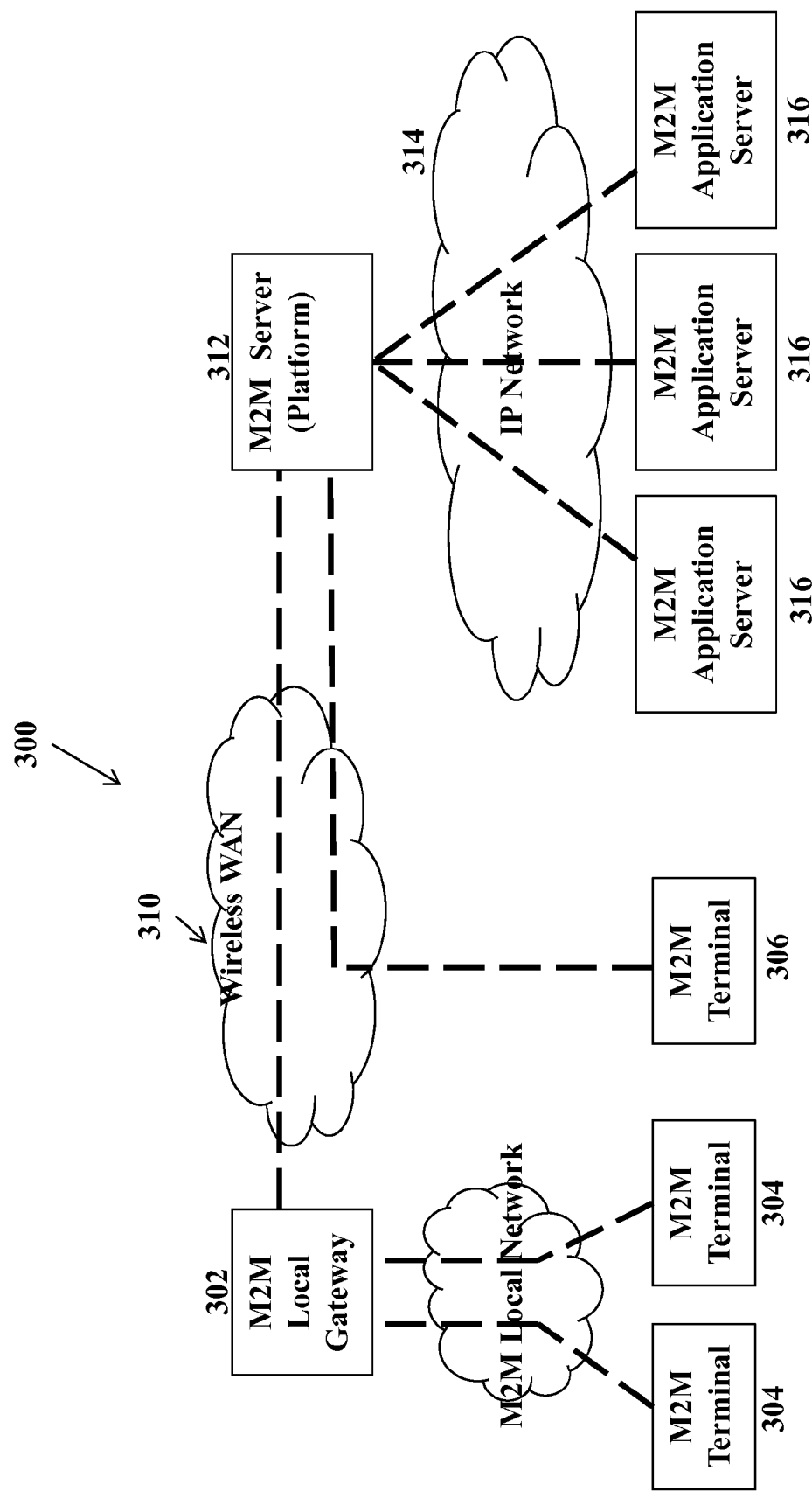
FIG. 3 M2M Client-Server Communication Reference Model

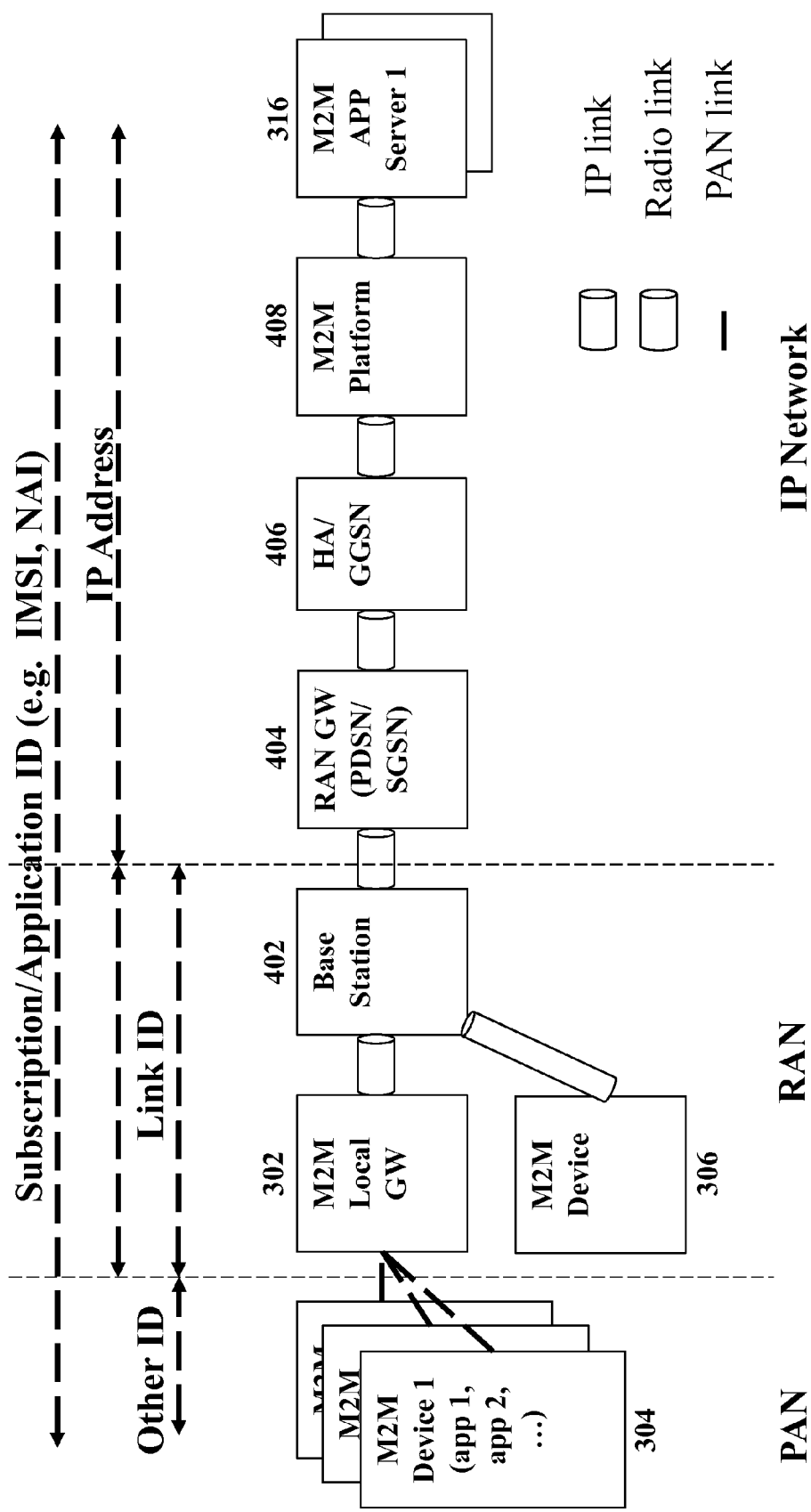
FIG. 4 Hierarchical Numbering

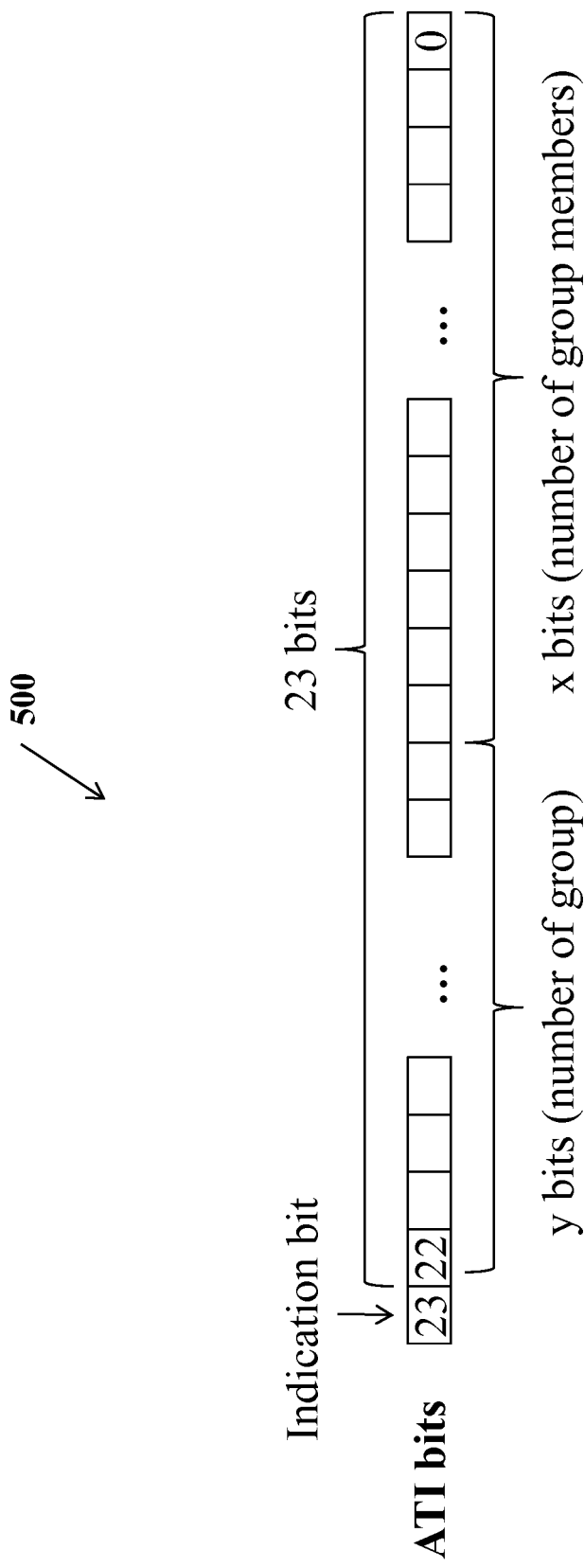
FIG. 5 HRPD M2M ID Numbering

| Field | Length (bits) |
|---|---|
| ATIType | 2 |
| ATI | 0 or 32 |

| Field | Description | Length (bits) |
|---|---|---|
| '00' | Broadcast ATI | 0 |
| '01' | Multicast/Group ATI | 32 |
| '10' | Unicast ATI | 32 |
| '11' | Random ATI | 32 |

FIG. 6A  HRPD MAC Header For GroupATI

| Field | Length (bits) |
|---|---|
| MessageID | 8 |
| MessageSequence | 8 |
| GroupSize | 4 |
| Reserved | 4 |

FIG. 6B GATIRequest Message

| Field | Length (bits) |
|---|---|
| MessageID | 8 |
| MessageSequence | 8 |
| Reserved1 | 7 |
| SubnetIncluded | 1 |
| GATISubnetMask | 0 or 8 |
| GATI104 | 0 or 104 |
| GATIColorCode | 8 |
| GATI024 | 24 |
| GATIGroupSize | 4 |
| UpperOldGATILength | 4 |
| Reserved2 | TBD |

FIG. 6C  GATIAssignment Message

| Field | Length (bits) |
|---|---|
| MessageID | 8 |
| MessageSequence | 8 |
| Reserved | 4 |
| UpperOldGATILength | 4 |
| UpperOldGATI | 8 x UpperOldGATILength |

FIG. 7 GATIAComplete Message

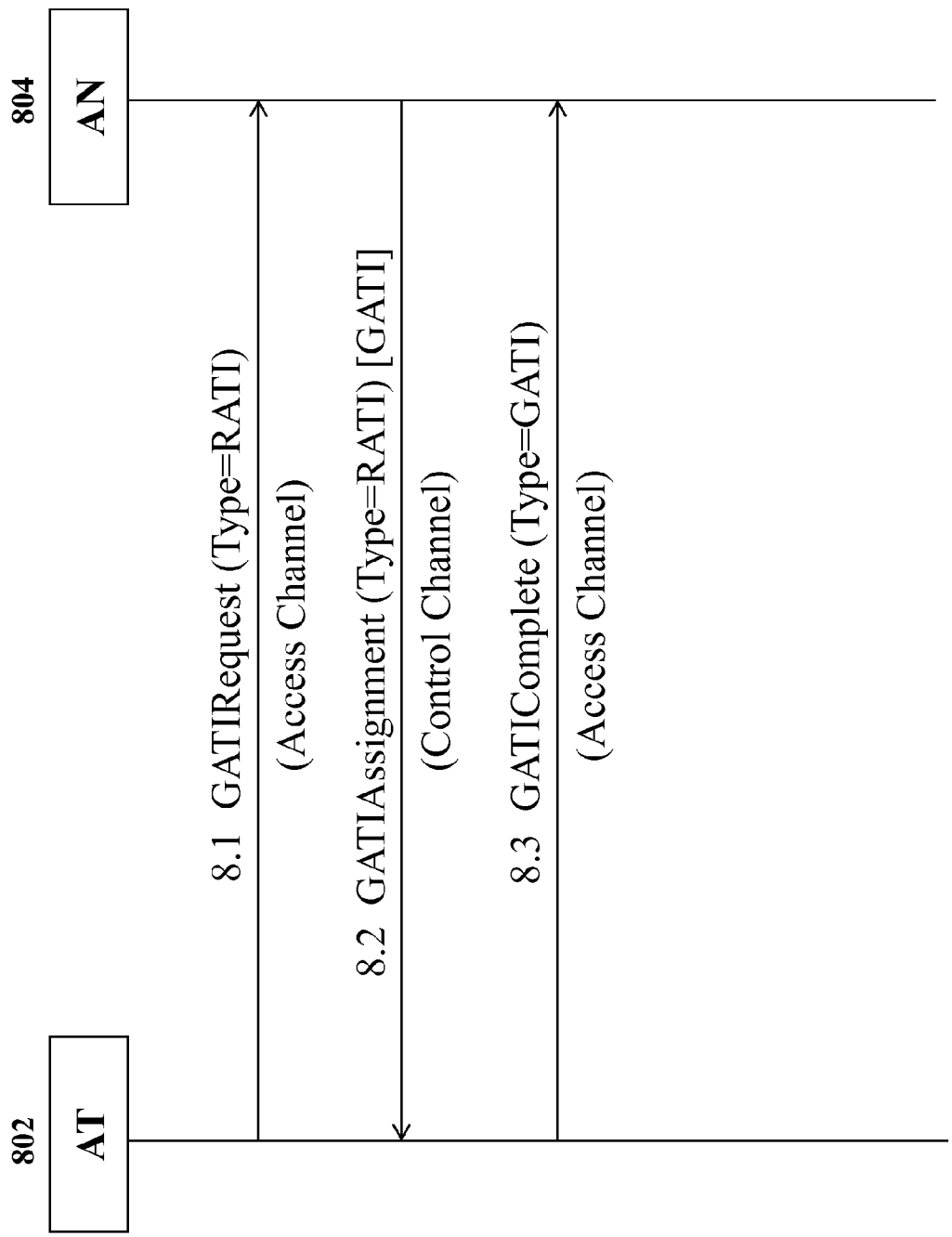
FIG. 8 Procedure of GATI Initial Assignment

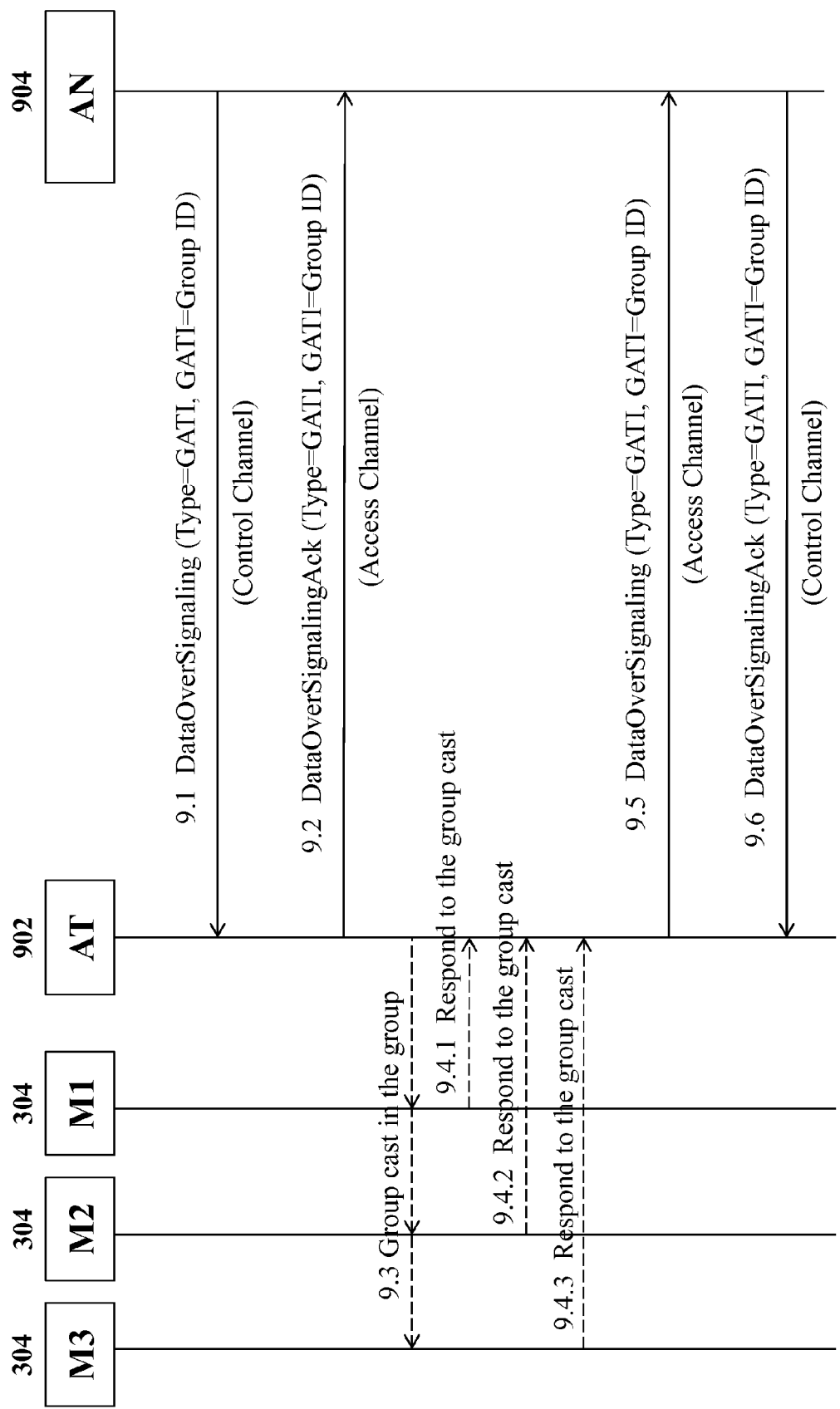
FIG. 9 Procedure of Group Casting Over The Air

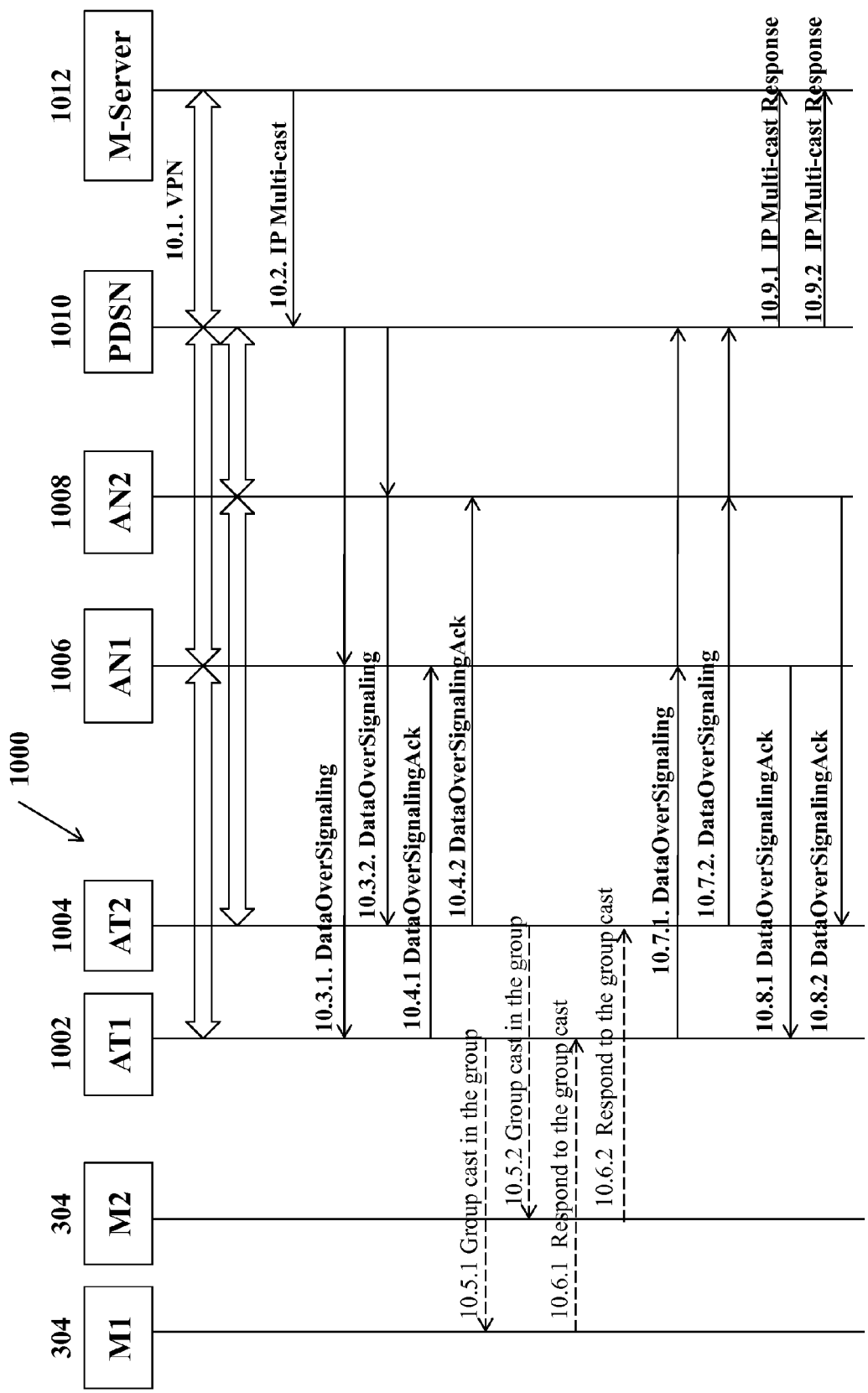
FIG. 10 Procedure of Group Casting in IP Domain

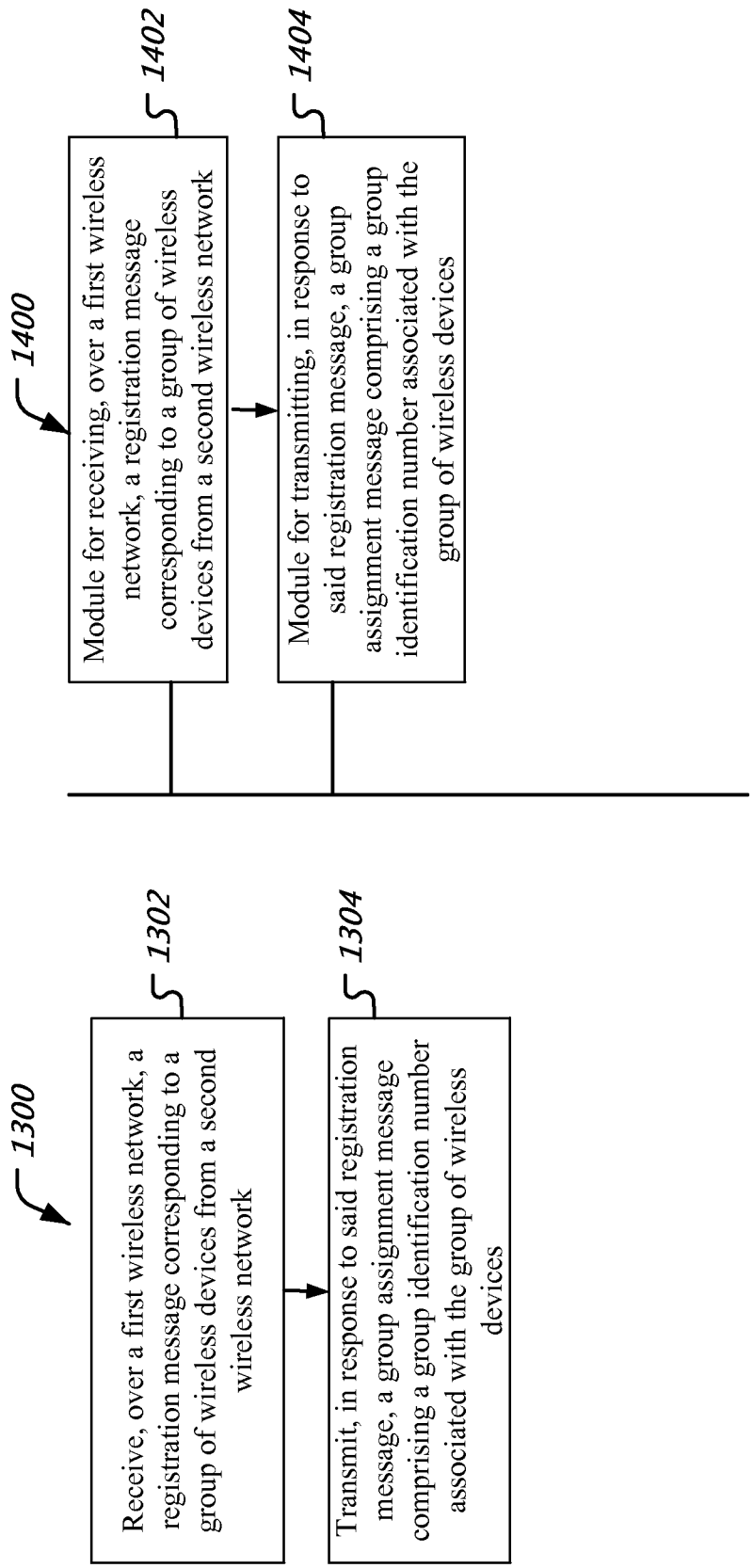

GROUP IDENTIFICATION OF WIRELESS COMMUNICATION DEVICES

CROSS REFERENCE TO RELATED APPLICATION

This patent document claims the benefit of priority from U.S. Provisional Patent Application No. 61/381,047, filed Sep. 8, 2010, the entire content of which is incorporated by reference as a part of this patent document.

BACKGROUND

This document relates to wireless communications.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base stations can be referred to as an access point (AP), access network (AN) or eNodeB, or can be included as part of an access network. Further, a wireless communication system can include one or more core networks to control one or more base stations.

A wireless device can use one or more different wireless technologies for communications. Various wireless technologies examples include Code division Multiple Access (CDMA) such as CDMA2000 1x, High Rate Packet Data (HRPD), and Long-Term Evolution (LTE), Worldwide Interoperability for Microwave Access (WiMAX). In some implementations, a wireless communication system can include multiple networks using different wireless technologies.

Wireless communications can be used to implement Machine to Machine (M2M) communications in various applications, e.g., machine automation such as home automation, security and alarms systems, smart grid meter reading, and others. Wireless M2M communications can be used to advantageously leverage wireless technologies to provide mobile M2M applications.

SUMMARY

This document describes technologies, among other things, device numbering schemes and mechanisms in wireless communication systems, including group identification and associated device numbering that enable group casting for sending out a message once to a group of wireless devices in wireless communication networks. The described technologies can be used for wireless M2M communications between wireless M2M devices/local gateway and radio networks.

In one aspect, a method of wireless communication includes registering, in a first wireless network, a group of wireless devices from a second wireless network; and facilitating group casting communication between said group of wireless devices and a server operating in said first wireless network.

In another aspect, a wireless communication apparatus includes a registration module for registering, in a first wireless network, a group of wireless devices from a second wireless network and a facilitator module for facilitating group casting communication between said group of wireless devices and a server operating in said first wireless network.

In yet another aspect, a computer program product comprising a non-volatile, computer-readable medium having instructions stored thereon is disclosed. The instructions comprise code for registering, in a first wireless network, a group of wireless devices from a second wireless network and code for facilitating group casting communication between said group of wireless devices and a server operating in said first wireless network.

In yet another aspect, a wireless communication method is disclosed. A registration message corresponding to a group of wireless devices from a second network is received over a first network. In response to the registration message, a group assignment message is transmitted. The group assignment message includes a group identification number associated with the group of wireless devices.

The details of the above and other aspects and their implementations are set forth in the accompanying drawings, the description and the claims.

BRIEF DESCRIPTION OF THE DRAWINGS

FIG. 2 shows an example of a radio transceiver station that can be used to for constructing the wireless devices or base station sin FIGS. 1A and 1B.

FIG. 3 shows an example of wireless M2M client-server communication reference model.

FIG. 4 shows an example of hierarchical numbering in wireless M2M communication network.

FIG. 5 shows an example of HRPD M2M numbering mechanism.

FIG. 6A shows an example of HRPD MAC header for GATI.

FIG. 6B shows an example of HRPD GATIRequest message format.

FIG. 6C shows a example of HRPD GATIAssignment message format.

FIG. 7 shows an example of HRPD GATIComplete message format.

FIG. 8 is a signal exchange diagram showing example signals exchanged during GATI initial assignment.

FIG. 9 shows an example of procedure of group casting over the air.

FIG. 10 shows an example of procedure of group casting in IP Domain.

FIG. 13 is a flow chart representation of another process of wireless communication.

FIG. 14 is a block diagram representation of a portion of a wireless communication apparatus.

DETAILED DESCRIPTION

Figure 1:
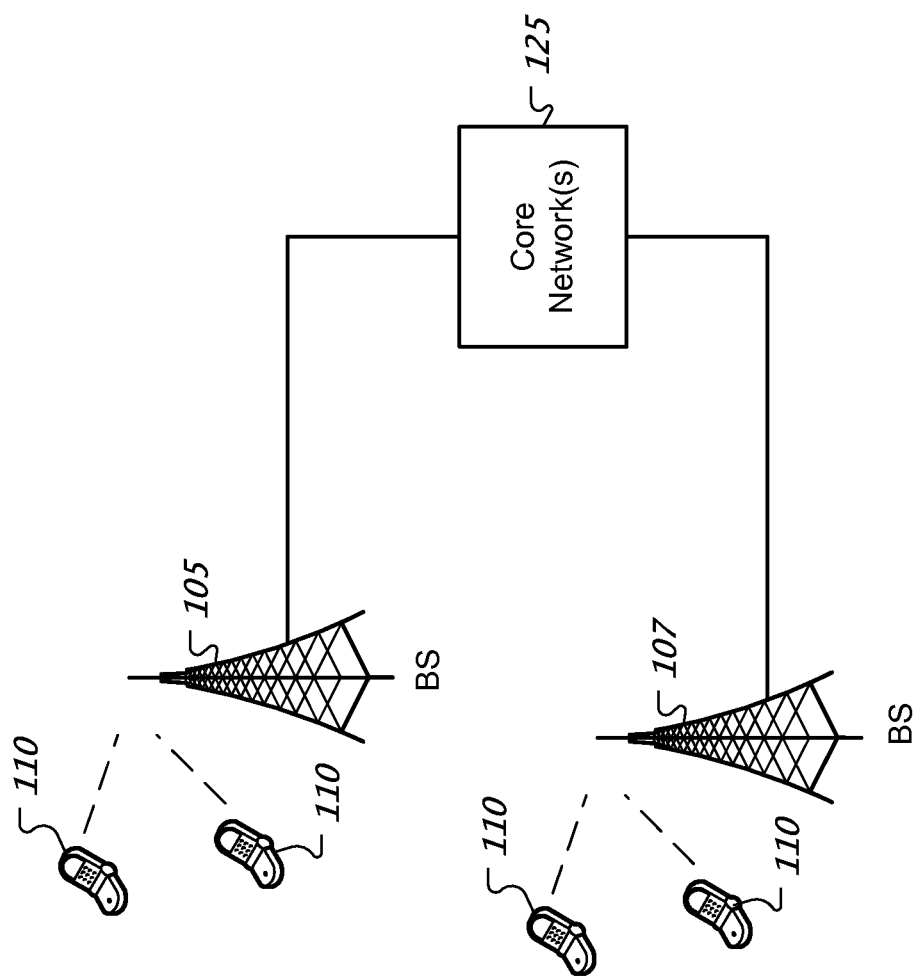
FIG. 1 shows an example of a wireless communication network for serving wireless devices.

This document describes techniques, devices, and systems for providing group identification and associated device numbering that enable group casting for sending out a message once to a group of wireless devices in wireless communication networks.

In one aspect, a method for wireless communications is provided to include providing in a header of a wireless airlink message a group identification field to include a group identification number for uniquely identifying multiple wireless devices within a group; and operating a radio access network to use the group identification number to send out a broadcast message once to reach multiple wireless devices within the group to which the group identification number is assigned to, without sending the broadcast message individually to each wireless device in the group based on an individual device identification number. In some implementations, the group identification number is a segment of an access terminal identifier (ATI). In addition, in some implementations, the segment of the access terminal identifier (ATI) for the group identification number includes a group identification part and a group member identification part.

In another aspect, a hierarchical numbering scheme is provided for identifying a M2M device in different communication layers and applications running on the device. The physical ID is a unique fixed ID associated to the device. The link level ID is a type address to indicate the location of the device over the air link. The IP level ID is actually an IP address, which provides the routing capability in IP domain. The application ID is used to identify the application running on the device.

In another aspect, a mapping is provided between IDs in different layers. In the airlink, the wireless M2M device may use a compact format of ID to identify itself during the reverse link transmission. The radio network may also use the compact format of ID to page and send the wireless M2M device a forward link packet.

In yet another aspect, one bit in the existing access terminal ID is used to distinguish a wireless M2M device or a local gateway. The radio network can page the wireless M2M devices in a group via its group address.

In wireless communications, multiple identification mechanisms can be used to identify wireless communication devices and to route communications to wireless communication devices. For example, there could be a large number of wireless M2M devices connecting to M2M application servers through the wireless cellular networks. Each wireless M2M device has a unique physical ID to be identified by the network. M2M devices may be designated for different purposes and/or run multiple applications, each service or application running on the device may require a unique application ID to be known by the M2M application server.

A wireless device needs an address in the network so that the network can locate the wireless device and communicate with the wireless device by either transmitting data or messages to, or receiving data or messages from, the wireless device. The air link may use the device ID to present its address. The device ID does not provide its location information and a registration process can be used to indicate the location of the device within the network when the wireless device communicates with the network the first time. In the IP domain, the device may not need this registration process to indicate its location and usually acquires an IP address which defines the location of device so that the data packet could be routed to the device in IP clouds.

Various technical challenges exist when using the existing cellular network to provide connectivity between M2M terminals/M2M local gateway and one or more M2M servers in the Core network. For example, there are the issues of Identification Space and Transmission Efficiency. A large number of M2M devices may be deployed for many applications and this may require a large ID space for device IDs. Device numbering mechanisms used for cellular networks may be used for identifying M2M devices but the long ID in the packet used to identify devices can compromise the efficiency in data transmission, especially for the short payload. For another example, many wireless networks lack a group casting mechanism for sending out a common message once to a group of wireless devices without making multiple individual sending operations to individual wireless devices in that group. Such a group casting mechanism for sending out a common message once to a group of wireless devices is desirable in many applications. For example, in a M2M application, a M2M server may need to send a message to the registered devices in a group casting way. In many existing wireless cellular technologies, the air interface includes an access terminal identification (ATID) field that is associated to one device but does not provide a way for providing a group ID for a group of wireless devices. In the wireless IP domain, the IP address is normally uniquely assigned to a device, not to a group.

Examples of group identification and associated device numbering for wireless communications are described below to enable group casting for sending out a message once to a group of wireless devices for M2M and other applications in wireless networks.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

FIG. 3 shows an example of wireless M2M communication reference model 300 for a wireless communication system shown in FIG. 1. This M2M communication model 300 is based on the client-server architecture. The M2M application servers 316 in the IP network connect to the M2M platform 312 over the IP network 314. The M2M platform 312 in an operator's core network serves as an anchor point for the M2M applications. The M2M server platform 312 provides a special layer of a communication adaptation protocol (CAP) to wrap the underlying different wireless wide area networks (WWANs) 310 such as CDMA2000, UMTS or E-UTRAN. Therefore, M2M applications could take advantages of any wireless (or wired) transport connections to carry the M2M data.

The M2M platform 312 communicates with the M2M devices (or terminals) 304 or local gateways 302 over the wireless wide area network (WWAN) 310. The M2M devices 304 or local gateways 302 also contain the communication adaptation protocol (CAP) special layer. The CAP provides the device management functions such as provisioning, monitoring or tracing the status of M2M devices 304 or local gateways 302.

M2M devices 304 (sometimes called access terminals, ATs) can either directly communicate with the WWAN 310 (e.g., M2M terminal 306) or indirectly with WWAN through one or more wireless local gateways 302. Device numbering for wireless devices or local gateways that directly connect WWAN is described below.

FIG. 4 shows an example of a hierarchical numbering scheme that provides a group ID for group casting. The M2M application servers 316 sit on the IP network, communicating to the radio access network (RAN) through the M2M platform 408 (which may be similar to the M2M server platform 312), Home Agent (HA)/Gateway GPRS Support Node (GGSN) 406, and Packet Data Serving Node (PDSN)/Serving GPRS Support Node (SGSN) 404 over IP protocols. A base station 402 in the radio access network (RAN) can either directly communicate with one or more attached M2M devices 306 or directly communicate with one or more local gateways 302 over WWAN air interface protocols such as CDMA2000, UMTS, or LTE. If a M2M device 304 is hidden from the local gateway 302, the M2M device 304 may use another wireless access technology to connect to the local gateway and uses the local gateway to communicate to the M2M application servers. Examples wireless technologies for connecting to the local gateway 302 include, among others, ZigBee, Blue Tooth or WiFi over a personal access network (PAN).

In the embodiment illustrated in FIG. 4, at the top of the present hierarchical numbering scheme, the subscription or application ID is an end-to-end identification between the application on M2M device and the server and can be used to identify the service/application. If multiple applications are running on a device, the application ID can be used to distinguish different services.

The next lower level numbering is in the IP layer. The wireless device acquires an IP address to position itself in the IP network. The acquired IP address for the device provides the routing capability in the IP domain between the M2M server and the device.

Below the IP layer, a link level numbering is provided across the radio access network. To provide better support of M2M applications, the link level numbering provides both point-to-point link ID for identifying an individual device attaching to the RAN and a point-to-multi-points' group ID for identifying the device group attaching to the RAN through the local gateway. The M2M devices 304 in the group are aggregated by the local gateway. Each group is assigned a group ID in the link level so that the network can used the group ID to page all the M2M devices 304 in the group in one message without sending separated messages addressed to individual M2M devices in the group. Each group member can have an individual link level ID to be identified by the network so that the network can transmit the data to the individual device 304 by using this individual link level ID. In addition, the local gateway 302 may be assigned a local gateway ID for control, management and other purposes.

In some designs, at the physical layer, each device 304 or local gateway 302 has a physical identification number (ID) such as the Electronic Serial Number (ESN) or a Mobile Equipment Identifier (MEID) marked on the device. The physical ID is a unique and fixed ID associated with the device and is used to identify the device. In various applications, the physical ID is typically used for the device level authentication.

After a wireless device (e.g., the M2M local gateway 302) is connected to the network, the link level ID and IP address provide different ways to locate the device. Since these IDs and addresses are for communication functions in different communication layers, there is some redundant when using the IP address over the air link connection. In order to reduce the redundancy and improve the transmission efficiency over the air, a mapping table between link level ID and IP address for the device can be provided in the radio access network gateway such as PDSN/SGSN 404. When the data packet is transmitted over the air link, the link level ID is used to identify the device as source address or destination address. A compact format of link level ID can be used to save the MAC header and improve transmission efficiency. When the data is transmitted over the IP network, the radio access network gateway such as PDSN 404 translates the link level ID in the header into the IP address of the device so that the data packet can be routed in the IP network.

FIG. 5 shows an example of link level ID numbering mechanism 500 for HRPD M2M devices 304 or the local gateway 302. In various existing implementation of the CDMA2000 HRPD technology, an 128-bit access terminal identifier (ATI) is used to identify an access terminal (AT) 306 that attaches to an access network, in which the most significant 104 bits are used to specify the radio access network and the least significant 24 bits are for identifying an individual access terminal. In order to distinguish two types of devices, i.e. regular mobile terminals and M2M devices/local gateway, the most significant bit, ATI[23] can be reserved for the type indication. Here is an example for using ATI[23].

For ATI[23]=0, ATI[23] indicates that the ATI is used to assigned to a regular HRPD access terminal. For ATI[23]=1, ATI[23] indicates that the ATI is used for wireless M2M devices 306 or local gateway 302. In FIG. 5, without loss of generality, bit position 0 may represent the least significant bit or the bit that is transmitted first in time.

To further distinguish the ID for a wireless M2M device 306 or a local gateway 302, the remaining 23 bits of ATI can be arranged as follows. For a wireless M2M local gateway 302 and attached devices 304, a group ATI (GATI) can be provided to include two segments: Group ID Segment and Member ID segment:

GATI[23:0]=1[23]+ATI[22:0]

where ATI[22:0]=Group ID Segment (y bits)+Member ID Segment (x bits). The group ID segment contains y bits while the member ID segment takes x bits.

With this arrangement, the group ID used to identify the M2M group is expressed as Group ID=1[23]+Group ID segment (y bits)+00 . . . 00 (x bits)

The M2M local gateway ID is expressed as:

Local Gateway ID=1[23]+Group ID segment (y bits)+ 00 . . . 01 (x bits)

The ID of M2M device attached to a local gateway is expressed as

Attached Device ID=1[23]+Group ID segment (y bits)+ Member ID segment (x bits) (other than 00 . . . 00 or 00 . . . 01)

For the wireless M2M device 306 directly attaching to the radio access network, its ATI can be expressed in the same as local gateway with GATI[22:0] with the number of group member=1.

FIG. 6A shows an example of CDMA2000 HRPD MAC header format for GATI. In this ATI format, the ATI type '01'' is used to indicate ATI as GATI. GATI length contains 32 bits, in which the least significant 24 bits are used for identifying the wireless M2M devices 304 or local gateway 302.

In some embodiments, the regular access terminal and wireless M2M device will share the 24-bits ATI space. Since the most significant bit ATI[23] is used to differentiate those two types of devices, the regular access terminal takes one from the first half ATI range, while M2M devices are assigned to one from the second half ATI range. In order to make radio access network to distinguish the two types of devices, a new set of messages are used for the wireless M2M to apply for GATI.

FIG. 6B shows an example of GATIRequest message. This message is used for the wireless M2M devices 304 or local gateway 302 to request initial GATI. In the message, it includes field MessageID: a new message ID for this message.
MessageSequence: for duplication detection.
GroupSize: for the M2M device/local gateway to request the size of the M2M group in the unit of bits.

FIG. 6C shows an example of GATIAssignment message format, which includes the following fields:

SubnetIncluded: the access network sets this field to '1' if the GATI104 field and GATISubnetMask fields are included in this message; otherwise, the access network sets this field to '0'.

GATISubnetMask: the access network omits this field if SubnetIncluded is set to '0'. If included, the access network sets this field to the number of consecutive 1's in the subnet mask of the subnet to which the assigned GATI belongs.

GATI104: the access network shall omit this field if SubnetIncluded is set to '0'. If included, the access network sets this field to GATI[127:24] of the GATI that it is assigned to the access terminal.

GATIColorCode: UATI Color Code. The access network sets this field to the Color Code associated with the subnet to which the GATI belongs.

GATI024: the access network sets this field to GATI[23:0] of the GATI that it is assigned to the access terminal.

GATIGroupSize: the radio access network sets the field to the granted size for the M2M group.

UpperOldGATILength: the radio access network sets this field to the number of least significant octets of OldGATI [127:24] that the access terminal is to send in the GATI-Complete message, in the range from 0 to 13, inclusive.

The GATIAssignment message may also include a time-out window value for use by the local gateway 302 when facilitating group cast traffic between the wireless devices 304 and servers 316.

FIG. 7 shows an example of GATIComplete message. The MessageID field may correspond to the ID of the request message which was completed.

FIG. 8 shows an example of a procedure for the GATI initial assignment. The access terminal (AT) 802 here represents M2M device 304 or local gateway 302. At step 8.1, the access terminal 802 sends a GATIRequest message over the access channel or RL connectionless channel with the RATI type in MAC header for requesting ATI assignment to the access network 804. The access terminal 802 may need to include the GroupSize in the message to indicate the number of its group members if the access terminal 802 presents an M2M local gateway 302. At step 8.2, the HRPD access network 804 sends a GATIAssigment message over the control channel using RATI type with GATI. The access network 804 may grant the same GroupSize as requested or different for the local gateway in the GATIAssignment message. At step 8.3, after receiving the GATIAssignment message, the access terminal 802 sends a GATIComplete message to the access network 804 by using assigned GATI. Subsequently, the assigned GATI is used to identify the access terminal 802 as the source ID in the RL transmission, or the destination in the FL transmission. The access terminal 802 may be, for example, the local gateway 302 or wireless device 306 connected to the access network 804.

FIG. 9 shows an example of procedure of group casting over the air link based on the group ID described above. In this example, the access terminal (AT) 902 represents a M2M local gateway 302. The AT 902 registers the group of wireless devices 304 with the HRPD access network 904 and received the GATIs for itself and its group using the GATI assignment mechanism, previously described. The M2M devices 304 are shown as M1, M2 and M3 which in wireless communication with AT 902 using, e.g., PAN technologies such as Bluetooth.

At step 9.1, the HRPD access network 904 sends a data packet in a HRPD Data Over Signaling (DOS) message to the M2M local gateway 902 over the control channel using the GATI type and GATI Group ID in MAC header to identifying the M2M local gateway 902.

At step 9.2, after receiving this DoS message, the access terminal 902 sends DataOverSignalingAck with the GATI Type and GATI Group ID in the MAC header over the access channel or RL connectionless channel.

At step 9.3, the access terminal 902 as the M2M local gateway 302 extracts the data packet from the received DoS message and broadcasts the data packet in its local network to the devices M1, M2 and M3, such as a wireless sensor network (WSN) or other wireless network based on other wireless technology.

At step 9.4, the M2M devices M1, M2 and M3 receive the broadcast message from AT 902 and each available M2M device sends its response back to the access terminal, i.e. M2M local gateway 302. In some designs, when an individual wireless device 304 is in sleep mode, then the AT 902 may not expect to receive any response from the wireless device that is in sleep mode. The AT 902 may further expect the wireless devices 304 to provide a response within a time-out window value specified by the AN 904.

At step 9.5, the access terminal 902 sends the received data packet in the DoS message over the access channel or RL connectionless channel, using the GATI Type and Group ID in the MAC header to identify the source ID. If the access terminal 902 sends a data packet on behalf of a M2M device, the group member GATI in the MAC header may be used.

At step 9.6, the access network 904 sends a DataOverSignalingAck with the GATI Type and Group ID back to the access terminal 902 after receiving the DoS message.

FIG. 10 shows an example of a procedure 1000 for the group casting in the IP domain. In some embodiments, the following messages may be exchanged.

10.1 A M2M server establishes a virtual private network (VPN) connection with wireless M2M devices M1 and M2 through PDSN 1010. Each M2M device 304 is assigned an IP address in the private network. M2M devices 304 might be connected through different access network such as AN1 1006 and AN2 1008.

10.2 The M2M server 1012 sends a group-cast packet/message to the registered M2M devices 304, such as M1 and M2 using multi-cast IP address through PDSN 1010.

10.3 PDSN 1010 routes the group-cast packet/message to attached ANs 1006, 1008. At 10.3.1, the PDSN 1010 sends the message to AN1 1006. AN1 1006 forwards the IP payload to AT1 1002 in encapsulated in Data Over Signaling (DoS) message using GATI over the control channel. At 10.3.2, the PDSN sends the message to AN2 1008. AN2 1008 forwards the IP payload to AT2 1004 in encapsulated DoS message using GATI over the control channel.

10.4.1 Upon receiving DoS message, AT1 1002 sends DataOverSignalingAck to AN1 1006, while, at 10.4.2, AT2 1004 sends DataOverSignalingAck to AN2 1008.

10.5.1 and 10.5.2, AT 1002, 1004 as a local gateway, send a corresponding group-cast message to attached M2M devices 304. The transmission may use different wireless technology from CDMA2000. The AT 1002, 1004 may not send corresponding individual messages to the devices 304.

10.6.1 and 10.6.2: Receiving M2M devices 304 send the response of group casting message back to the AT 1002, 1004 over other local wireless air interface.

10.7.1 and 10.7.2: Upon receiving the response from attached M2M devices 304, AT 1002, 1004 encapsulate them in DoS message and sends to AN. AN then forwards the payload of DOS to PDSN.

10.8.1 and 10.8.2: Upon receiving DoS from AT 1002, 1004, AN 1006, 1008 sends an ACK back.

10.9.1, 10.9.2: After receiving IP packet from AN, PDSN 1010 forwards them to M2M server over IP network as responding the multi-cast message.

Figures 11, 12:
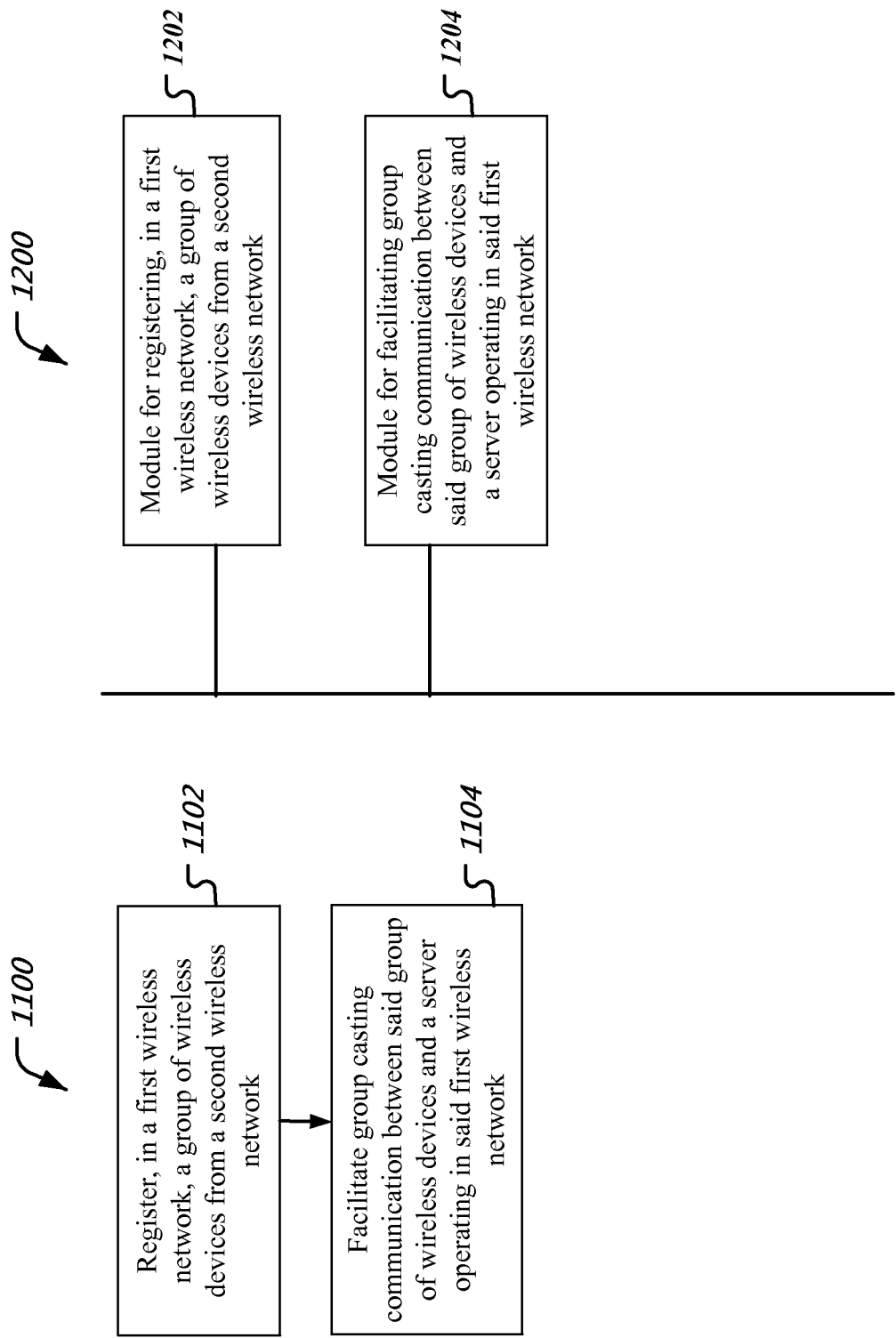
FIG. 11 is a flow chart representation of a process of wireless communication.
FIG. 12 is a block diagram representation of a portion of a wireless communication apparatus.

FIG. 11 is a flowchart representation of a process 1100 of wireless communications. At 1102, a group of wireless devices from a second network are registered in a first wireless network. The registration may, e.g., correspond to the previously discussed registration of M2M terminals 304 from the M2M local network in a wireless WAN network. At 1104, group casting between the group of wireless devices and a server operating in the first wireless network is facilitated. For example, the facilitation may be performed at the M2M local gateway 302, as previously described.

In some embodiments, the registration may be performed by transmitting a group registration message and receiving a group assignment message. As previously discussed with respect to FIG. 8, the group registration message may be transmitted from the AT 802 to the access network 804 (e.g., a server or base station within the access network 804) over an access channel. In some embodiments, the group assignment message is received over the control channel of a WWAN at the AT 802, e.g., as described with respect to FIG. 8.

In some embodiments, the facilitating of group casting communication may be performed as described with respect to FIGS. 9 and 10. In some embodiments, a first message that includes a group identification number indicative of a group of wireless devices, is received, e.g., at the AT 802. The first message may be received over a WWAN such as CDMA1000 and the like. In some embodiments, the AT 802 broadcasts a second message over a second wireless network (e.g., a personal area network such as Bluetooth) to the group of wireless devices, without sending a corresponding individual message to any wireless device in the group of wireless devices. In some embodiments the AT 802 may explicitly or implicitly use a time-out window value to receive response from the wireless devices 304. When the AT 802 receives response from the wireless devices 304, the AT 802 transmits over the first wireless network an acknowledgement message. In some embodiments, the AT 802 may transmit the acknowledgement message within a time-out window value time of receiving the first message.

In some designs, the group identification number includes a subset of an access terminal identifier, e.g., as discussed with respect to FIGS. 4 and 5. In some designs, the subset of the ATI includes a group identification portion and a group member identification portion. In some designs, the group identification portion comprises an end bit position of the subset of the ATI. For example, the end bit may be the most significant bit (e.g., bit 23) of the field. In some embodiments, the subset of ATI may include bits that are not contiguous.

FIG. 12 is a block diagram representation of a portion of a wireless communications apparatus 1200. The wireless communications apparatus 1200 may, e.g., correspond to the M2M local gateway 302. The module 1202 is for registering, in a first wireless network, a group of wireless devices from a second wireless network. The module 1204 is for facilitating group casting communication between said group of wireless devices and a server operating in said first wireless network. The first wireless network may be, e.g., the wireless WAN. The second wireless network may be, e.g., the M2M local network 306. The communication apparatus 1200 and the modules 1202, 1204 may further be configured to implement one or more techniques discussed in this document.

FIG. 13 is a flowchart representation of a process 1300 of wireless communications. At 1302, a registration message is received over a first wireless network. The registration message corresponds to a group of wireless devices from a second wireless network. At 1304, in response to the registration message, a group assignment message comprising a group identification number associated with the group of wireless devices is transmitted.

FIG. 14 is a block diagram representation of a portion of a wireless communications apparatus 1400. The registration module 1402 is for receiving, over a first wireless network, a registration message corresponding to a group of wireless devices from a second wireless network. The facilitator module 1404 is for transmitting, in response to said registration message, a group assignment message comprising a group identification number associated with the group of wireless devices. The apparatus 1400 and the modules 1402, 1404 may be further configured to implement one or more techniques described in this document.

It will be appreciated that several techniques for group identification of wireless communication devices and facilitating group casting between the group of wireless communication device and a server are disclosed.

In one aspect, the disclosed techniques include registering the group using a group identification number that includes a subset of an access terminal identifier. In some designs, bit 23 of the ATI is used to identify the address as being a group address (instead of being the address assigned to a single wireless device). For example, in some designs, bit 23 may be set to the value "1" for a group address and "0" for addresses assigned to a single device.

It will further be appreciated that a M2M local gateway is disclosed that facilitates group casting communication between the group of wireless devices and a server. In some designs, the M2M local gateway uses broadcast communication for transmitting group messages to the wireless devices. In some designs, a time-out value received from the WAN may be used to manage message acknowledgements.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication apparatus, comprising:
    means for receiving, over a first wireless network, a registration message corresponding to a group of wireless devices from a second wireless network; and
    means for transmitting, in response to said registration message, a group assignment message comprising a group identification number associated with the group of wireless devices;
    wherein the group identification number includes a subset of an access terminal identifier (ATI);
    wherein the subset of the ATI comprises twenty three contiguous bits and wherein the group identification portion comprises a bit in a most significant position of the subset of the AT!.

2. The wireless communication apparatus as in claim 1, further comprising:
    means for transmitting, over the first wireless network, a group casting message to the group of wireless devices, without sending a corresponding individual message to any wireless device in the group of wireless devices.

3. A wireless communication apparatus, comprising:
    transceiver electronics operable to receive, over a first wireless network, a wireless signal carrying a registration message corresponding to a group of wireless devices from a second wireless network; and a processor and a memory that are coupled to each other to process signals to and from the transceiver electronics, the processing operable to, in response to said registration message, produce a group assignment message comprising a group identification number associated with the group of wireless devices and to direct the group assignment message to the transceiver electronics which sends an output wireless signal carrying the group assignment message;

wherein the group identification number includes a subset of an access terminal identifier (ATI);

wherein the subset of the ATI comprises twenty three contiguous bits and wherein the group identification portion comprises a bit in a most significant position of the subset of the ATI.

4. The wireless communication apparatus as in claim 3, wherein:

the processor is configured to produce a group casting message to be transmitted to the group of wireless devices by the transceiver electronics, without causing the transceiver electronics to send a corresponding individual message to a wireless device in the group of wireless devices.

5. A wireless communications method, comprising:

registering, by an access terminal operating in a first wireless network, a group of wireless devices from a second wireless network; and facilitating, by the access terminal, group casting communication between said group of wireless devices and a server operating in said first wireless network;

wherein said registering comprises:

transmitting a group registration message over the first wireless network; and receiving a group assignment message comprising a group identification number associated with the group of wireless devices;

wherein the group identification number includes a subset of an access terminal identifier (ATI), wherein the ATI is a link layer identifier of the access terminal, the group identification number comprising the subset and a second portion that identifies the first wireless network;

wherein the subset of the ATI for the group identification number includes a group identification portion and a group member identification portion;

wherein the group identification portion comprises an end bit position of the subset of the AT.

6. The method as in claim 5, wherein said facilitating comprises:

receiving a first message over the first wireless network, the first message including a group identification number indicative of the group of wireless devices; and broadcasting, over the second wireless network, a second message to the group of wireless devices, without sending a corresponding individual message to any wireless device in the group of wireless devices.

7. The method as in claim 6, further comprising:

receiving, over the second wireless network, a first acknowledgement message from at least one wireless device of the group of wireless devices; and transmitting, over the first wireless network, a second acknowledgement message based on the first acknowledgement message.

8. The method as in claim 6, further comprising:

receiving a time-out window value associated with the first message; and transmitting a response message within the time-out window value time of the receiving the first message.

9. A wireless communications method, comprising:

registering, by an access terminal operating in a first wireless network, a group of wireless devices from a second wireless network; and facilitating, by the access terminal, group casting communication between said group of wireless devices and a server operating in said first wireless network;

wherein said registering comprises:

transmitting a group registration message over the first wireless network; and receiving a group assignment message comprising a group identification number associated with the group of wireless devices;

wherein the group identification number includes a subset of an access terminal identifier (ATI), wherein the ATI is a link layer identifier of the access terminal comprising the subset and a second portion that identifies the second wireless network;

wherein the subset of the ATI for the group identification number includes a group identification portion and a group member identification portion;

wherein the subset of the ATI comprises twenty three contiguous bits and wherein the group identification portion comprises a bit in a most significant position of the subset of the ATI.

10. The method as in claim 9, wherein said facilitating comprises:

receiving a first message over the first wireless network, the first message including a group identification number indicative of the group of wireless devices; and broadcasting, over the second wireless network, a second message to the group of wireless devices, without sending a corresponding individual message to any wireless device in the group of wireless devices.

11. The method as in claim 10, further comprising:

receiving, over the second wireless network, a first acknowledgement message from at least one wireless device of the group of wireless devices; and transmitting, over the first wireless network, a second acknowledgement message based on the first acknowledgement message.

12. The method as in claim 10, further comprising:

receiving a time-out window value associated with the first message; and transmitting a response message within the time-out window value time of the receiving the first message.

13. The apparatus of claim 3, wherein the transceiver electronics is further operable to:

receive a first message over the first wireless network, the first message including a group identification number indicative of the group of wireless devices; and broadcast, over the second wireless network, a second message to the group of wireless devices, without sending a corresponding individual message to any wireless device in the group of wireless devices.

14. The apparatus as in claim 13, wherein the transceiver electronics is further operable to:

receive, over the second wireless network, a first acknowledgement message from at least one wireless device of the group of wireless devices; and transmit, over the first wireless network, a second acknowledgement message based on the first acknowledgement message.

15. The apparatus as in claim 13, wherein the processor further:

receives a time-out window value associated with the first message; and transmits a response message within the time-out window value time of the receiving the first message.

16. The apparatus as in claim 3, wherein the transceiver electronics is further operable to:
 transmit a time-out window value associated with the group identification number.

17. The apparatus as in claim 3, wherein the transceiver electronics further:
 transmits, over the second wireless network, a group casting message to the group of wireless devices, without sending a corresponding individual message to any wireless device in the group of wireless devices.

18. A computer program product comprising a non-transitory, computer-readable medium having instructions stored thereon, the instructions comprising:
 code for registering, in a first wireless network, a group of wireless devices from a second wireless network; and
 code for facilitating group casting communication between said group of wireless devices and a server operating in said first wireless network;

wherein said code for registering comprises:
 code for transmitting a group registration message over the first wireless network; and
 code for receiving a group assignment message comprising a group identification number associated with the group of wireless devices;
wherein the group identification number includes a subset of an access terminal identifier (ATI), wherein the ATI is a link layer identifier of the access terminal comprising the subset and a second portion that identifies the second wireless network;
wherein the subset of the ATI for the group identification number includes a group identification portion and a group member identification portion;
wherein the instructions further include:
 code for receiving a time-out window value associated with the first message; and
 code for transmitting a response message within the time-out window value time of the receiving the first message.

* * * * *